US006879922B2

(12) United States Patent
Hogle et al.

(10) Patent No.: US 6,879,922 B2
(45) Date of Patent: Apr. 12, 2005

(54) SYSTEMS AND METHODS FOR SUPPRESSING PRESSURE WAVES USING CORRECTIVE SIGNAL

(75) Inventors: Joseph Alan Hogle, Roanoke, VA (US); Michael Glynn Wise, Roanoke, VA (US); Steven Mark Shaver, Rocky Mount, VA (US); Michael Eugene Austin, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 755 days.

(21) Appl. No.: 09/682,559

(22) Filed: Sep. 19, 2001

(65) Prior Publication Data

US 2003/0051479 A1 Mar. 20, 2003

(51) Int. Cl.$^7$ .................................................. G06F 19/00
(52) U.S. Cl. .............................................. 702/98; 702/85
(58) Field of Search ........................... 60/312; 381/71.1, 381/71.2; 700/280; 702/85, 98, 106, 127, 138

(56) References Cited

U.S. PATENT DOCUMENTS 3,936,606 A * 2/1976 Wanke ...................... 381/71.5
4,122,674 A 10/1978 Andersson et al.
4,409,787 A 10/1983 Davi et al.
4,607,529 A 8/1986 Morey
5,018,202 A * 5/1991 Takahashi et al. ......... 381/71.5
5,347,586 A 9/1994 Hill et al.
5,380,190 A * 1/1995 Kumagai ....................... 431/1
5,386,689 A * 2/1995 Bozich et al. ................ 60/803
5,445,517 A * 8/1995 Kondou et al. ............... 431/18
5,533,121 A * 7/1996 Suzuki et al. .......... 379/406.02
5,575,144 A * 11/1996 Brough ........................ 60/779
5,621,656 A * 4/1997 Langley ...................... 700/280
5,636,287 A * 6/1997 Kubli et al. ............... 381/71.2
5,668,744 A * 9/1997 Varadan et al. ............. 700/280

(Continued)

OTHER PUBLICATIONS

Haddad, W; Chellasina, V; Kablar N;"Active Control of Combustion Instabilities via Hybrid Resetting Controller-s";Proceedings American Control Conference; vol. 4; Jun. 28, 2000; pp 2378–2382.*

Krstic, M; Krupadanam, A; Jacobson, C;"Adaptive Stabilization of Nonlinear Acoustic Oscillations in Combustion Chambers"; Proceedings of the 36th IEEE Conference on Decision and Control; vol. 4; Dec. 10–12, 1997; pp 3640–3645.*

Krstic, M; Krupadanam, A; Jacobson, C;"self–tuning control of a nonlinear model of combustion instabilities"; Proceedings IEEE International Conference on Control Applications; Oct. 5–7, 1997; pp 285–287.*

*Primary Examiner*—John Barlow
*Assistant Examiner*—Douglas N Washburn
(74) *Attorney, Agent, or Firm*—Hunton & Williams LLP

(57) ABSTRACT

A method for providing a corrective modulation signal to suppress an acoustic pressure wave in an operational system. The method includes sampling the acoustic pressure wave generated in the operational system; sampling a previously generated corrective modulation signal; performing fast Fourier transform processing on the sampled acoustic pressure wave; a pair of single frequency discrete Fourier transform processing is performed on the sampled acoustic pressure wave; determining the frequency, phase and magnitude of a dominate pressure wave in the acoustic pressure wave based on the fast Fourier and discrete Fourier transform processing; generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave.

29 Claims, 7 Drawing Sheets

U.S. PATENT DOCUMENTS

| | | | | | |
|---|---|---|---|---|---|
| 5,685,157 | A | | 11/1997 | Pandalai et al. | |
| 5,778,081 | A | * | 7/1998 | Patrick | 381/71.5 |
| 5,791,889 | A | | 8/1998 | Gemmen et al. | |
| 5,966,452 | A | * | 10/1999 | Norris | 381/71.1 |
| 5,996,337 | A | * | 12/1999 | Blosser et al. | 60/274 |
| 6,108,413 | A | * | 8/2000 | Capman et al. | 379/406.13 |
| 6,137,886 | A | * | 10/2000 | Shoureshi | 381/71.2 |
| 6,170,265 | B1 | | 1/2001 | Polifke et al. | |
| 6,330,336 | B1 | * | 12/2001 | Kasama | 381/71.1 |
| 6,650,701 | B1 | * | 11/2003 | Hsiang et al. | 375/232 |

* cited by examiner

SYSTEMS AND METHODS FOR SUPPRESSING PRESSURE WAVES USING CORRECTIVE SIGNAL

BACKGROUND OF THE INVENTION

The systems and methods of the invention relate to the suppression of acoustic pressure waves, and in particular, to the suppression of acoustic pressure waves in gas turbine combustion chambers.

It should be appreciated that adverse acoustic pressure waves may be generated in a variety of operational systems. For example, such adverse acoustic pressure wave may be generated in gas turbines. This problem may manifest itself when trying to increase the efficiency of the flames in the combustion chambers of such a gas turbine, for example. That is, the problem may manifest itself when trying to reduce the undesirable emissions generated by a gas turbine. By reducing the emissions, and the rate at which governmental emissions allotments are consumed, it is possible to maximize the number of revenue hours of the gas turbine.

That is, when the flames are "leaned out," the emissions go down. However, the flame burning in the gas turbine may become unstable. Such an unstable flame creates a pressure wave, which may be of audible frequencies, and hence termed an "acoustic pressure wave." The acoustic pressure waves may stress various portions of the gas turbine, causing fatigue and shortening the life of the turbine. Specifically, torsional vibrations on the gas turbine's shaft may be created resulting in flexing and stressing the turbine blades. Additionally, the acoustic pressure wave may damage internal baffling in the combustion chamber. The acoustic pressure wave may also adversely affect the efficiency of the machine.

There are known techniques relating to the active suppression of combustion chamber acoustics. However, the known techniques fail to teach an effective process to establish a corrective modulation signal at the correct magnitude, frequency and phase. Some known techniques create a modulation signal using adaptive filtering. The difficulty with such a technique lies in the need to, and time required for, filter coefficients to adapt when the acoustic signature is changing spectral content rapidly. Also, in the absence of any automatic gain control, the known techniques may actually exacerbate the undesired acoustic while re-adapting to the new spectral content. Accordingly, the known techniques suffer from the above drawbacks, as well as others.

BRIEF SUMMARY OF THE INVENTION

The systems and methods of the invention solve the above problems, as well as other problems, present in known techniques. In accordance with one aspect, the invention provides a method for providing a corrective modulation signal to suppress an acoustic pressure wave in an operational system, the method comprising the steps of sampling the acoustic pressure wave generated in the operational system; sampling a previously generated corrective modulation signal, the previously generated corrective modulation signal having parameters; performing fast Fourier transform processing on the sampled acoustic pressure wave; performing a pair of single frequency discrete Fourier transform processing on the sampled acoustic pressure wave; determining the frequency, phase and magnitude of a dominate pressure wave in the acoustic pressure wave based on the fast Fourier transform processing and the discrete Fourier transform processing; and generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave.

In accordance with a further aspect, the invention provides a corrective modulation system for providing a corrective modulation signal to suppress an acoustic pressure wave in an operational system, the system comprising a pressure sampling device that samples the acoustic pressure wave generated in the operational system to provide a sample of the acoustic pressure wave; a phase output portion, the phase output portion providing a sample of a phase of a previously generated corrective modulation; a signal processing portion that processes the sample of the acoustic pressure wave and the sample of the phase of the previously generated corrective modulation, the signal processing portion including a fast Fourier transform processing portion that performs a fast Fourier transform process on the sample of the acoustic pressure wave, the signal processing portion generating frequency with maximum power information and maximum power information based on the fast Fourier transform process; at least two discrete Fourier transform processing portions that perform single frequency discrete Fourier transform processing, the signal processing portion generating pressure phase information based on the single frequency discrete Fourier transform processing, and a modulation phase processing portion, the modulation phase processing portion generating modulation phase information based on the sample of the phase of the previously generated corrective modulation. The system further includes a corrective modulation generator that generates a sinusoidal corrective modulation signal to suppress the acoustic pressure wave based on the frequency with maximum power information and maximum power information, the pressure phase information, and the modulation phase information, wherein the corrective modulation signal being at substantially the same frequency as, and generally 180 degrees out of phase with, the acoustic pressure wave.

In accordance with a further aspect, the invention provides a system for providing a corrective modulation signal to suppress an acoustic pressure wave in an operational system, the system comprising means for sampling the acoustic pressure wave generated in the operational system; means for sampling a previously generated corrective modulation signal, the previously generated corrective modulation signal having parameters; means for performing fast Fourier transform processing on the sampled acoustic pressure wave; means for performing a pair of single frequency discrete Fourier transform processing on the sampled acoustic pressure wave; means for determining the frequency, phase and magnitude of a dominate pressure wave in the acoustic pressure wave based on the fast Fourier transform processing and the discrete Fourier transform processing; and means for generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave.

In accordance with a further aspect, the invention provides a method for providing a corrective modulation signal to suppress an acoustic pressure wave in a gas turbine system, the method comprising the steps of sampling the acoustic pressure wave generated in the gas turbine system; sampling a previously generated corrective modulation signal, the previously generated corrective modulation signal having parameters; performing fast Fourier transform processing on the sampled acoustic pressure wave; performing a pair of single frequency discrete Fourier transform processing on the sampled acoustic pressure wave; determining the frequency, phase and magnitude of a dominate pressure wave in the acoustic pressure wave based on the fast Fourier transform processing and the discrete Fourier transform processing; generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave; generating a frequency error; generating a phase error; and providing a gain control based on the frequency error, the phase error and the magnitude of the dominate pressure wave, the gain control generating a gain signal to adjust the corrective modulation signal.

In accordance with a further aspect, the invention provides a corrective modulation system for providing a corrective modulation signal to suppress an acoustic pressure wave in an operational system, the system comprising a pressure sampling device that samples the acoustic pressure wave generated in the operational system to provide a sample of the acoustic pressure wave; a phase output portion, the phase output portion providing a sample of a previously generated corrective modulation; a signal processing portion that processes the sample of the acoustic pressure wave and the sample of the previously generated corrective modulation, the signal processing portion including a fast Fourier transform processing portion that performs a fast Fourier transform process on the sample of the acoustic pressure wave, the signal processing portion generating frequency with maximum power information and maximum power information based on the fast Fourier transform process; at least one discrete Fourier transform processing portion that performs single frequency discrete Fourier transform processing, the single frequency discrete Fourier transform processing including performing a first single frequency discrete Fourier transform on a first part of the sample, which is processed by the signal processing portion to generate pressure $phase_K$ information, and performing a second single frequency discrete Fourier transform on a second part of the sample, which is processed by the signal processing portion to generate pressure $phase_{K-1}$ information, and a modulation phase processing portion, the modulation phase processing portion generating modulation $phase_K$ information and modulation $phase_{K-1}$ information based on the sample of the previously generated corrective modulation; a corrective modulation generator that generates a sinusoidal corrective modulation signal to suppress the acoustic pressure wave based on the frequency with maximum power information and maximum power information; the pressure $phase_K$ information and the pressure $phase_{K-1}$ information; and modulation $phase_K$ information and modulation $phase_{K-1}$ information; and the corrective modulation signal being at substantially the same frequency as, and generally 180 degrees out of phase with, the acoustic pressure wave.

In accordance with a further aspect, the invention provides a system for providing a corrective modulation signal to suppress an acoustic pressure wave in a gas turbine, the system comprising means for sampling the acoustic pressure wave generated in the gas turbine; means for sampling a previously generated corrective modulation signal, the previously generated corrective modulation signal having parameters; means for performing fast Fourier transform processing on the sampled acoustic pressure wave; means for performing a pair of single frequency discrete Fourier transform processing on the sampled acoustic pressure wave; means for determining the frequency, phase and magnitude of a dominate pressure wave in the acoustic pressure wave based on the fast Fourier transform processing and the discrete Fourier transform processing; means for generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave; means for generating a frequency error; means for generating a phase error; and means for providing a gain control based on the frequency error, the phase error and the magnitude of the dominate pressure wave, the gain control generating a gain signal to adjust the corrective modulation signal.

BRIEF DESCRIPTION OF THE DRAWINGS

The present invention can be more fully understood by reading the following detailed description of the exemplary embodiments together with the accompanying drawings, in which like reference indicators are used to designate like elements, and in which.

DETAILED DESCRIPTION OF THE INVENTION

Figure 1:
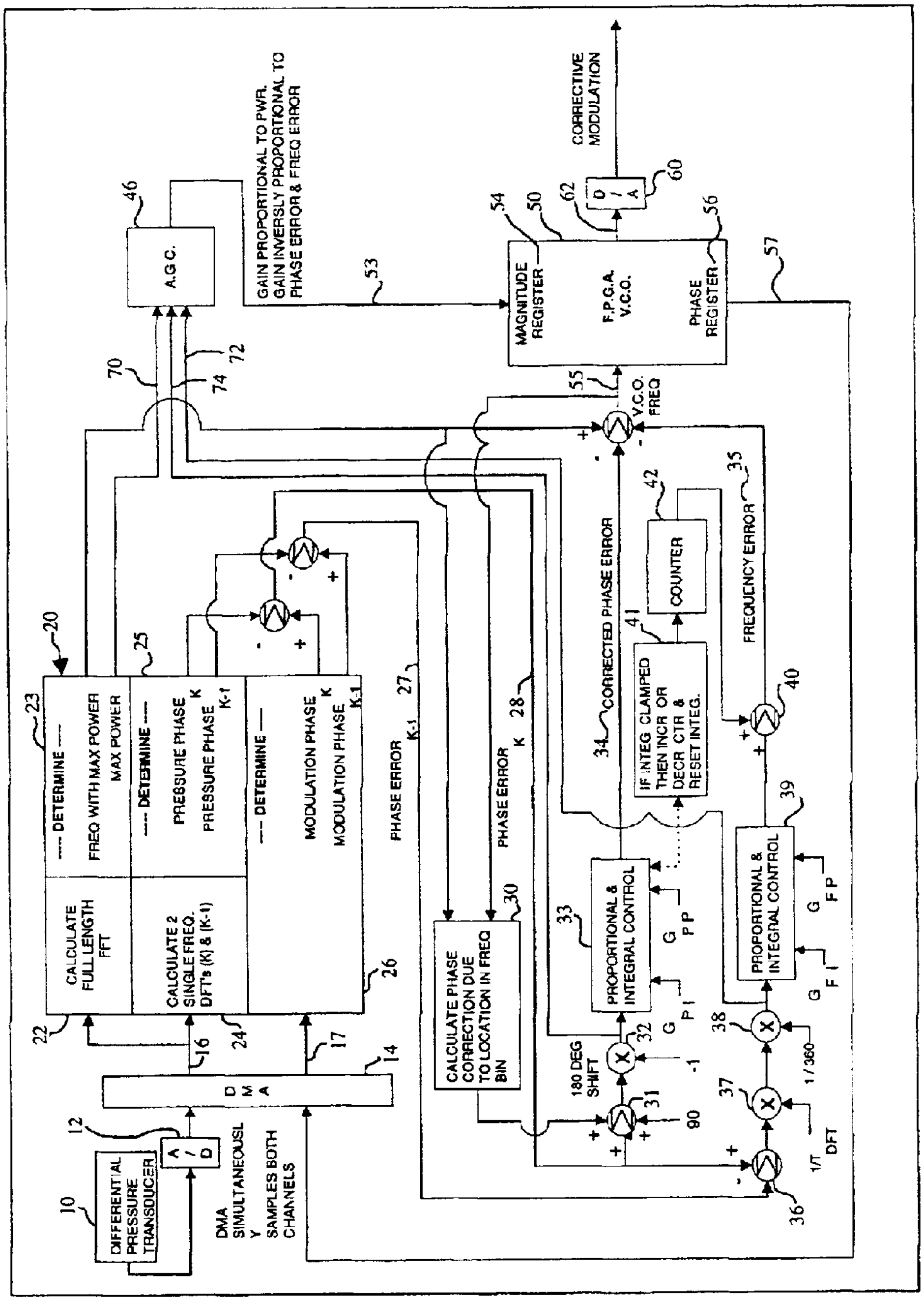
FIG. 1 is a schematic diagram showing a system and process of generating a corrective modulation signal in accordance with one embodiment of the methods and systems of the invention.

The systems and methods of the invention offer a technique for providing a corrective modulation signal to suppress an acoustic pressure wave in an operational system, such as a gas turbine, for example. In accordance with one embodiment of the invention, the method includes the steps of sampling the acoustic pressure wave generated in the operational system, performing a fast Fourier transform (FFT) on the sampled acoustic pressure wave, and performing two single frequency discrete Fourier transforms (DFTs) on the sampled acoustic pressure wave.

The method further includes determining the frequency, magnitude and phase of the dominate spectral component of the acoustic pressure wave based on the FFT and the DFTs processing. Further, the method includes generating a sinusoidal corrective modulation signal to suppress the acoustic pressure wave at the same frequency and resulting magnitude as that of the dominate pressure wave. The phase of the corrective modulation signal is sampled and controlled in such a manner as to establish a 180 degree phase relationship, i.e., appropriately taking into account, propagation delay corrections, with the dominate spectral component of the acoustic pressure wave.

Hereinafter, various aspects of the invention will be described in further detail. The systems and methods of the invention provide a corrective modulation signal for use in the suppression of acoustic pressure waves in an operational system, and in particular in a combustion chamber of a gas turbine. However, it should be appreciated that the invention is not limited to such application. That is, the method of the invention may be utilized in a variety of operating environments in which control of acoustic pressure waves is desired.

In accordance with embodiments of the methods and systems of the invention, a modulation is generated at the correct frequency and phase via a novel technique. This technique combines the spectral analysis of a Fast Fourier Transform (FFT) with the inherent phase information of a voltage-controlled oscillator implemented in a field programmable gate array. It should be appreciated that the method of the invention eliminates required hardware and reduces associated costs. Computational loading of the processing unit is also reduced, releasing this resource for other uses. Additionally, the spectral analysis of the pressure waves is made available to the turbine control system for protective actions, time tagging, trending, or further analysis, for example.

Gas turbine combustion systems can experience dynamic pressure oscillations in the audible frequency range, i.e., acoustics. These oscillations, if of sufficient magnitude and persisting long enough, can damage the combustion system, reduce the life expectancy of the system and/or affect the operation of the turbine. It should be appreciated that active control of these acoustics poses certain signal processing problems. First, the dominant pressure wave must be identified both in terms of frequency and magnitude. This must be discerned from potentially, a very noisy spectral background.

Secondly, a corrective modulation signal must be created for application to a secondary fuel valve or an air bleed valve, for example, or some other device used to actively affect turbine parameters in order to reduce or eliminate the acoustics. This corrective modulation signal is locked at a 180 degree phase relationship to the acoustic pressure wave that is be squelched. In other words, the corrective modulation signal is located so as to be generally 180 degrees out of phase with the acoustic pressure wave, i.e., so that the relationship serves to cancel out the undesired acoustic pressure wave. Additionally, it is desirable to adjust the magnitude of the modulation in direct proportion to the amplitude of the acoustic pressure wave and inversely proportional to the phase relationship of the modulation to the acoustic pressure wave. The adjustment of the magnitude of the modulation in direct proportion to the amplitude of the acoustic pressure wave allows the suppression efforts to be of a magnitude to reduce the acoustic, but no larger, thereby avoiding the introduction of other undesirable effects. The adjustment of the magnitude of the modulation in inverse proportion to the phase relationship of the modulation to the acoustic pressure wave assures that until the desired 180 degree relationship is approximately established, the magnitude of the modulation will be small or zero. This avoids the undesirable case where, while locking, the modulation and acoustic are in phase and therefore the modulation is exacerbating the problem.

The systems and methods of the invention provide for two primary objectives, which are met efficiently and in a real time manner. With reference to FIG. 1, the first objective is to provide spectral analysis of an input signal coming from a differential pressure transducer 10 that monitors the pressure in a gas turbine combustion chamber, for example, in accordance with one embodiment of the methods and systems of the invention. However, it should be appreciated that other devices may be used to perform such input signal. In accordance with further aspects of the methods and systems of the invention, the analysis of the invention determines the spectral component of the acoustic pressure wave with the largest power, as well as the frequency associated with the acoustic pressure wave. The entire results, or a portion of the results, of the spectral analysis can also be made available to the rest of a turbine control system for protection or trending, for example.

Secondly, the systems and methods of the invention provide for the generation of a sinusoidal modulation signal that is at the same frequency as the spectral component of the acoustic pressure wave with the largest power, and which is locked at a 180-degree phase relationship with that acoustic pressure wave. The systems and methods of the invention provide for meeting these objectives in a manner minimizing hardware and associated costs, and minimizing computational time.

FIG. 1 is a block diagram showing aspects of the process in accordance with one embodiment of the methods and systems of the invention. A pressure transducer 10, which may be a differential pressure transducer, for example, is placed within the combustion chamber of a gas turbine, in accordance with one embodiment of the methods and systems of the invention. It should be appreciated that a transducer may be used that is not differential. Should the pressure transducer not be differential, the process of the invention can still be utilized by removing the D.C. part, i.e. the time invariant part of the signal by ignoring this component in the spectral analysis in a manner described below. The output of the pressure transducer is passed through signal conditioning circuitry and then to an A/D converter 12, as shown in FIG. 1.

It should be appreciated that the frequency response range of the transducer may exceed the frequency range of interest for the acoustic pressure wave desired to be controlled. If the frequency response range of the transducer exceeds the frequency range of interest for the acoustic pressure wave, an anti-aliasing filter may be utilized in conjunction with the signal conditioning circuitry, i.e., before the A/D converter 12. Similarly, should significant broadband noise be present on the pressure transducer signal, an anti-aliasing filter may be required.

Figure 2:
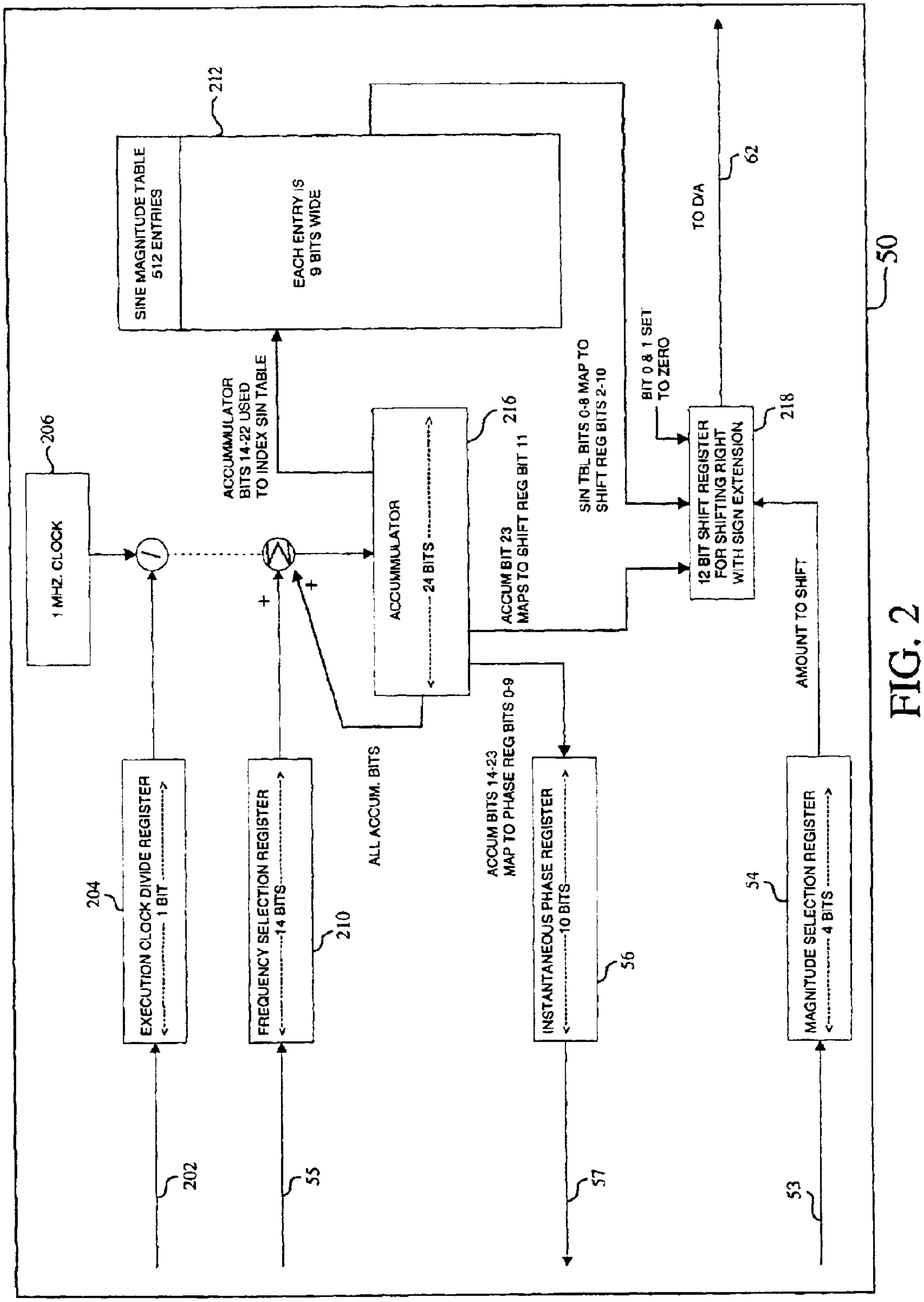
FIG. 2 is a schematic diagram showing the details of the field programmable gate array, that generates the modulation waves, of FIG. 1 in further detail in accordance with one embodiment of the methods and systems of the invention.

The signal from the A/D converter 12 is simultaneously sampled along with a signal from a phase register 56, which travels along path 57, as shown in FIG. 1. The count of the phase register 56 gives the instantaneous phase of the current corrective modulation, i.e., the corrective modulation currently being applied and generated, in accordance with one embodiment of the methods and systems of the invention. This register is a part of a sinusoidal voltage-controlled oscillator (VCO), which generates the corrective modulation. The VCO is implemented in a field programmable gate array (FPGA) 50, the details of which are further shown in FIG. 2 and described below. That is, FIG. 2 is a schematic diagram showing the details of the field programmable gate array 50 that generates the modulation in accordance with one embodiment of the method of the invention. Accordingly, the field programmable gate array (FPGA) 50 may be characterized as a corrective modulation generator 50.

The simultaneous sampling of the A/D converter 12 and the instantaneous phase register 56 is done via a Direct Memory Addressing unit (DMA) 14 of a microprocessor. In accordance with one embodiment of the methods and systems of the invention, a total of 2048 pairs of simultaneous samples of the A/D converter 12 and phase register 56 are taken, which provide input 16 and input 17 into the signal processing portion 20. However, it should be appreciated that the systems and methods are not limited to such sampling, i.e., variations of the 2048 sample arrangement may be utilized. The DMA 14 allows the sampling to proceed without any participation by a main or a central processing unit, for example. Therefore, sampling can occur in parallel with the processor computing values on a last set of samples.

In accordance with one embodiment of the methods and systems of the invention, firmware, running on a micro processor, processes the 2048 pairs of samples. The first steps of such processing are shown in the signal processing portion 20, shown in FIG. 1. Also, the process is shown in further detail in FIG. 3 and described below. The signal processing portion 20 includes the processing portion 22, the processing portion 23, the processing portion 24, the processing portion 25 and the processing portion 26, as shown in FIG. 1.

In accordance with one embodiment of the methods and systems of the invention, a mathematical windowing algorithm is used on the 2048 samples output from the A/D converter 12. This windowing is necessary to prevent signal discontinuities at the beginning and the end of the sampling from being analyzed as high frequency components. Such components, along with possible aliasing, might appear as false spectral components anywhere in the analyzed spectrum. The windowing serves to shape the samples, forcing the samples to zero at the first and last sample. As a result, discontinuities at the ends of the sampling may be removed. In accordance with embodiments of the methods and systems of the invention, a windowing process may be performed using one of a variety of known methods including the Rectangular method, the Hamming method, the Hanning method, the Triangular method, the Blackman method, the Blackman-Harris method or the Flat Top method, for example.

The output from the windowing process, in accordance with one embodiment of the methods and systems of the invention, then has a Fast Fourier Transform (FFT) performed on such output, as illustrated in processing portion 22 in FIG. 1. Next, for each complex element in the FFT, the power is calculated in processing portion 23, as shown in FIG. 1, according to the equation:

$$\text{POWER}=\lfloor(\text{REAL PART OF } FFT)^2+(\text{IMAGINARYPART OF } FFT)^2\rfloor/FFT\ \text{LENGTH}^2 \quad \text{(Equation 1)}$$

In accordance with one embodiment of the methods and systems of the invention, the maximum power of all the FFT elements is determined and referred to in the processing portion 23 as MAX POWER. The frequency associated with this power, which is referred to as FREQ WITH MAX POWER in processing portion 23 in FIG. 1, is also known, i.e., since each element E, in the FFT, has a frequency associated with it according to the equation:

$$FREQUENCY_E = \frac{E}{FFT\ LENGTH} * \text{SAMPLING FREQUENCY} \quad \text{(Equation 2)}$$

where:

E=FFT element number, also referred to as a bin number, and ranges from 0 to the (FFT length−1), which in accordance with one embodiment of the invention is 0 to 2047; and FFT LENGTH=number of samples on which the FFT is performed, which in accordance with one embodiment of the invention is 2048.

It should be appreciated that since the input is real and not complex, only elements E=0 to E=(FFT length/2) are independent and therefore the FFT bin frequencies should be computed over such range. Therefore, in accordance with one embodiment of the methods and systems of the invention, the FFT bin frequencies will range from 0 to a Sampling Frequency/2, and associated bin numbers from 0 to 1024.

As noted above, it should be appreciated that rather than the differential pressure transducer 10, a pressure transducer may be utilized that is not differential. If the pressure transducer is not differential, the first FFT bin can be eliminated from the maximum power determination. This bin contains the steady or D.C. component and is generally not of concern in acoustic suppression, in accordance with embodiments of the methods and systems of the invention.

Figure 4:
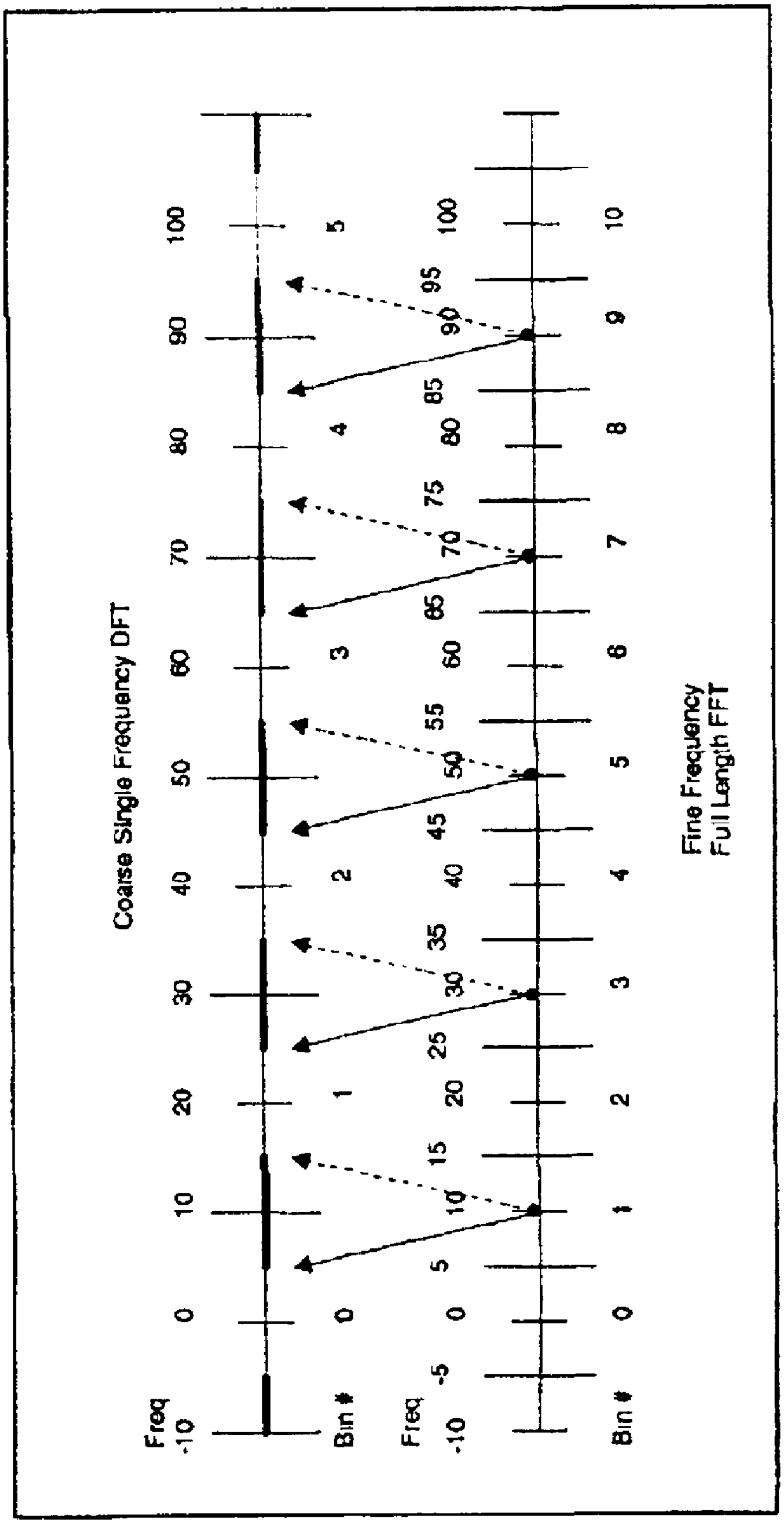
FIG. 4 is a diagram showing a comparison of the frequency range of an N element FFT bin versus the frequency range of a corresponding coarse single frequency DFT bin in accordance with one embodiment of the invention.
Figure 5:
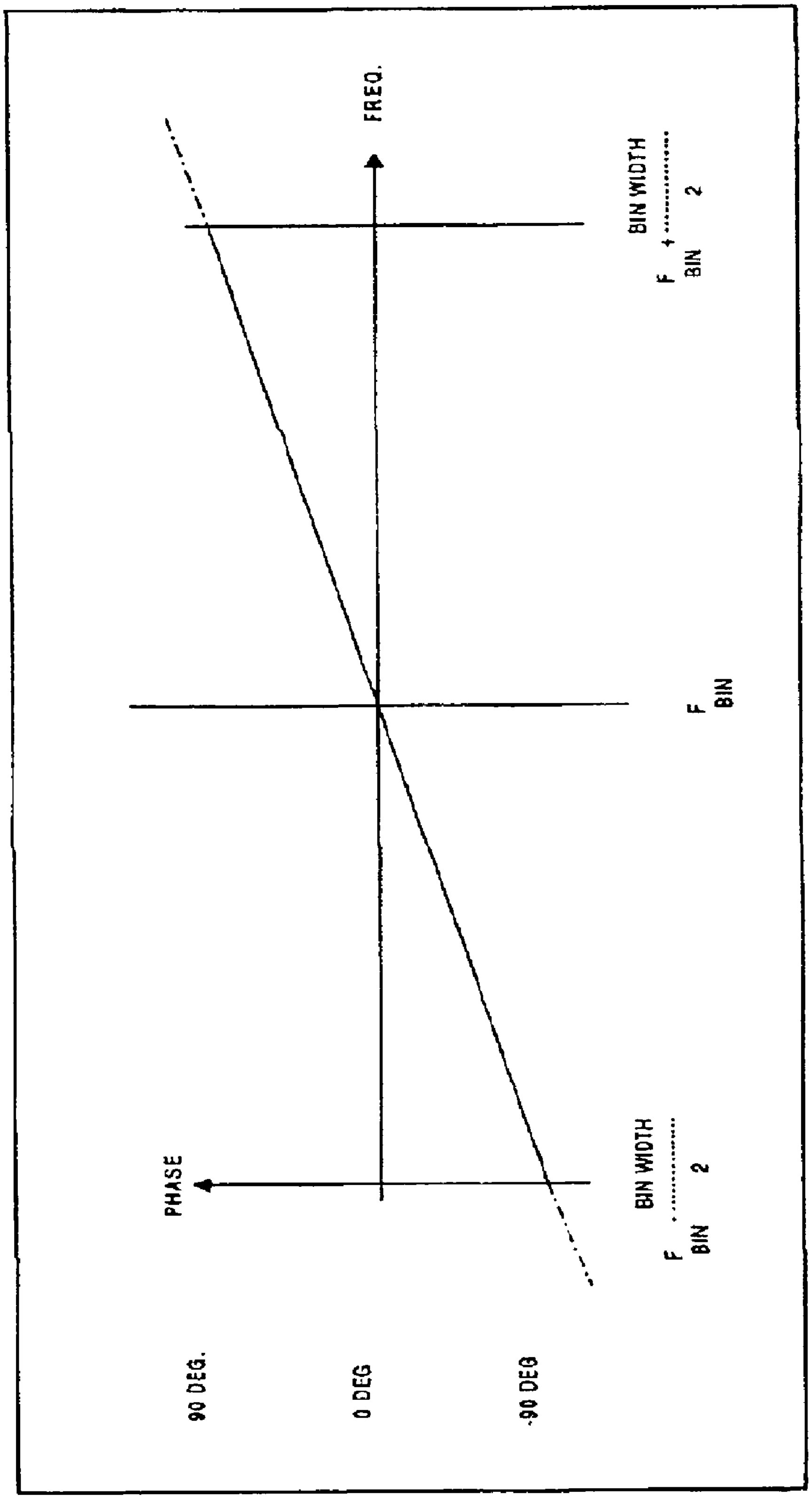
FIG. 5 is a diagram showing aspects of the phase frequency relationship of either a FFT or DFT bin in accordance with one embodiment of the methods and systems of the invention.

It should be appreciated that the attenuation of the magnitude near a frequency bin's boundaries or edges is affected by the windowing selected. This "roll off," however, is typically present to some degree and is pictured in FIG. 4. FIG. 4 is a diagram showing aspects of a single frequency bin in accordance with one embodiment of the invention. Further, FIG. 5 illustrates the phase shift that must be corrected across a frequency bin of any Fourier transform. Mathematically the phase shift occurring across a frequency bin may be calculated as follows:

$$\text{PHASE SHIFT IN DEGREES}=180*(K-M)*(1-(1/N)) \quad \text{(Equation 3)}$$

Where:

M=bin number, with bin numbers starting at 0;

K=number of cycles in n samples of the frequency of interest; and

N=number of samples.

It should be appreciated that both of these phenomena cause difficulty in accurately calculating the phase of a frequency component that is at or near the edges of a frequency bin. To alleviate this situation, two single frequency DFT's are performed as shown in processing portion 24 of FIG. 1. Each single frequency DFT is calculated at the frequency of the maximum power that has already been determined. Each single frequency DFT is also performed on exactly half the samples that the FFT was performed on, i.e., 1024, in accordance with one embodiment of the methods and systems of the invention. This will result in the width of the single frequency DFT's frequency bin being twice as wide in terms of frequency as the frequency bins of the FFT. The resulting resolution in the frequency spectrum is illustrated in FIG. 4. This shows a simple example of the mapping of the full length FFT into the more coarse frequency resolution of the single frequency DFT. The bin resolution illustrated in FIG. 4 is not necessarily the preferred frequency spectrum bin resolution, but is merely illustrative, in accordance with one embodiment of the methods and systems of the invention. As shown in FIG. 4 there is a direct mapping of the even frequency bins of the full length FFT into the corresponding single frequency DFT bin with the relationship:

Single Frequency *DFT* Bin Number=Full Length *FFF* Bin Number/2 (Equation 4)

However there exists an ambiguity with the mapping of the odd full length FFT frequency bins into the single frequency DFT frequency bins as shown in FIG. 4 by the thick horizontal bans on either side of the single frequency DFT bin boundaries. As can be seen by the dual arrows mapping the full length FFT bin to either side of the single frequency DFT bin boundary a choice has to be made when mapping the odd numbered full length FFT bins:

Single Frequency *DFT* Bin Number=truncate(Full Length *FFT* Bin Number/2) (Equation 5)

or

Single Frequency *DFT* Bin Number=(Full Length *FFT* Bin Number/2)+1 (Equation 6)

By default, Equation 5 is the initial attempt to map the odd full length FFT frequency bin into the single frequency DFT frequency bin, in accordance with one embodiment of the methods and systems of the invention. If a frequency lock is not achieved within a predetermined number of scans the alternate mapping, Equation 6, is implemented to acquire lock.

Hereinafter, further aspects of the 2048 samples will be described in accordance with one embodiment of the methods and systems of the invention, and in particular, processing relating to the single frequency DFTs. The 2048 samples may be considered as two groups as shown in the processing portion 24 of FIG. 1. The oldest 1024 samples, i.e. the first 1024 samples taken, may be characterized as group K-1. The newest 1024 samples, i.e. the last 1024 samples taken, may be characterized as group K. Each group of samples is windowed in a manner similar to that done on the entire 2048 samples as discussed above. Each windowed group of samples then has a single frequency Discrete Fourier Transform performed on it at the frequency with the maximum power that has been calculated, as discussed above. This processing is shown in the processing portion 24 in FIG. 1, as well as FIG. 3, and is designated as "SINGLE FREQ DFT."

Further, the phase angle of the of the frequency at which the maximum power was found is calculated, in processing portion 25, for group K as follows:

$$PHASE_K = \text{ARCTAN}\left(\frac{\text{IMAGINARY PART OF SINGLE FREQ } DFT_K}{\text{REAL PART OF SINGLE FREQ } DFT_K}\right) \quad \text{(Equation 7)}$$

The meaning of this phase angle should be appreciated. That is, such phase angle is the phase of the spectral component, who's frequency at which the maximum power was found, at the instant that the first sample of $FFT_K$ was taken.

In further description of the systems and methods of one embodiment of the invention, the phase angle of the frequency at which the maximum power was found, at the instant that the first sample of $DFT_{K-1}$ was taken, may now be calculated. This calculation is performed, by the processing portion 25, using group K-1. The equation for this processing in accordance with one embodiment of the methods and systems of the invention is:

$$PHASE_{K-1} = \text{ARCTAN}\left(\frac{\text{IMAGINARY PART OF SINGLE FREQ } DFT_{K-1}}{\text{REAL PART OF SINGLE FREQ } DFT_{K-1}}\right) \quad \text{(Equation 8)}$$

Figure 3:
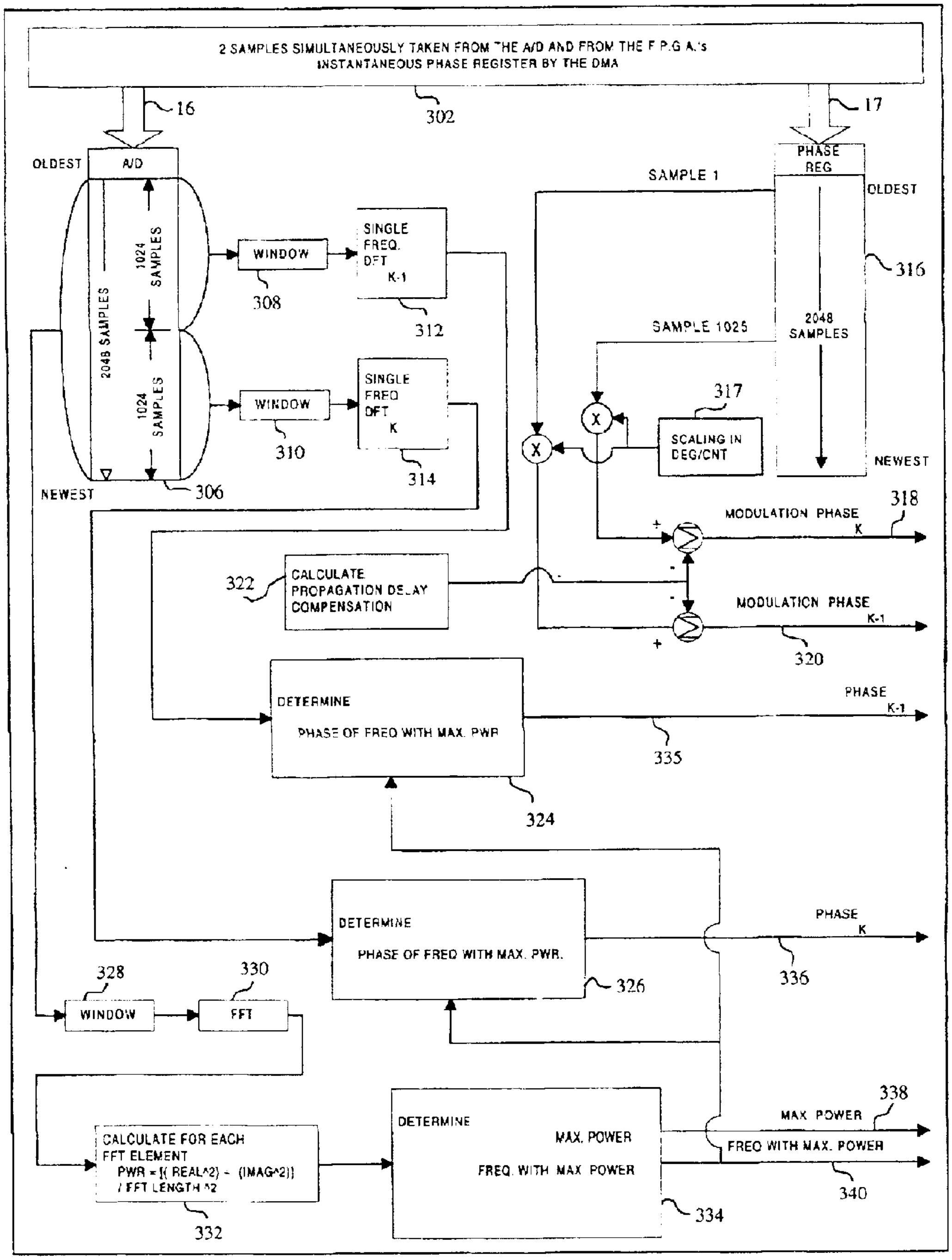
FIG. 3 is a schematic diagram showing further details of the system of FIG. 1, including the detailed implementation of the calculations shown in signal processing portion 20 of FIG. 1 in accordance with one embodiment of the methods and systems of the invention.

It should be appreciated that if there is significant propagation delay from when the modulation is applied to when an effective change in the acoustic results, a compensation can be made. This compensation is shown in FIG. 3, i.e., processing portion 322, and is some number of degrees being subtracted from the modulation phases. The compensation degrees can be calculated as follows:

Propagation delay compensation in degrees=VCO FREQ IN *HZ.**360 *DEG.*/CYCLE*Propagation delay in seconds (Equation 9)

Now, remembering that the A/D converter samples and those of the instantaneous phase register were taken simultaneously, it becomes easy to calculate the phases of the corrective modulation that correspond to the PHASE K and PHASE K-1, which were just calculated. That is, one merely selects sample number 1 and sample number 1025 from the instantaneous phase register and, thereafter, scales the count values into degrees. These scaled values, with compensation for propagation delays if needed, become the modulation phase angles referred to in FIG. 1, i.e., in processing portion 26, and FIG. 3, as MODULATION $PHASE_K$ and MODULATION $PHASE_{K-1}$.

With further reference to FIG. 1, two phase errors, PHASE $ERROR_K$ 28 and PHASE $ERROR_{K-1}$ 27, as shown in FIG. 1, may then be calculated by merely subtracting the A/D phases from the corresponding modulation phases. Any necessary phase correction, due to the difference between the VCO's frequency and the center frequency of the associated FFT bin, is calculated at processing portion 30 in FIG. 1. PHASE $ERROR_K$ is then corrected in calculation portion 31 for the 90 degree shift between the VCO sine based phase and the cosine based phase, which are calculated by the single frequency DFT.

Additionally, the PHASE $ERROR_K$ is corrected in the calculation portion 31 for the phase that occurred due to the frequency component's placement within the frequency bin. Finally, the PHASE $ERROR_K$ is shifted 180 degrees in calculation portion 32, fed into a proportional and integral control 33 with its gains of $G_{PI}$ (Phase path, Integral gain) and $G_{PP}$ (Phase path, Proportional gain). As a result, the method of the invention produces the CORRECTED PHASE ERROR 34, as shown in FIG. 1. The schematic diagram of FIG. 6 details the proportional and integral control (33, 39) used both in the phase and the frequency paths of the invention.

In accordance with embodiments of the methods and systems of the invention, the difference of the two phase errors i.e., PHASE $ERROR_K$ PHASE $ERROR_{K-1}$ is compared in calculation portion 36 and is used to calculate a slip frequency, or what may be characterized as a FREQUENCY ERROR 35 in FIG. 1. It should be appreciated that since the change in phase error occurred over the time it took to accumulate the number of samples for a DFT, the difference is first multiplied by 1 over that time as illustrated in calculation portion 37 of FIG. 1, i.e.

$$1/T_{DFT}$$

Next, in accordance with one embodiment of the methods and systems of the invention, in order to change from units of degrees/time to cycles/time a multiplication by 1/360 is done in calculation portion 38 of FIG. 1. The result is fed into a proportional and integral control 39, as well as the gains of $G_{FI}$ (Frequency path, Integral gain) and $G_{FP}$ (Frequency path, Proportional gain).

The output of the proportional and integral control 39 is added in calculation portion 40 to the count value residing in a counter 42, i.e., which counts the number of times the phase integrator hit either a positive or negative clamp. In accordance with one embodiment of the methods and systems of the invention, a count of (+1) is added to the counter 42, by a processing portion 41 as shown in FIG. 1, every time the phase integrator hit the positive clamp and the integrator was reset, and a count of (−1) is added for each time the negative clamp was hit and the integrator was reset. The sum of the counter 42 and the output of the frequency proportional and integral control 39 forms the corrected frequency error 35, as shown in FIG. 1.

It should be appreciated that it now becomes possible to determine the instantaneous frequency at which the VCO is to run. That is, the sum of the corrected frequency error 35 and the corrected phase error 34 is subtracted from the FREQ WITH MAX POWER output and then scaled into the appropriate count value to make the VCO run at that frequency, i.e., the V.C.O. frequency 55 as shown in FIG. 1. In accordance with one embodiment of the methods and systems of the invention, the equation for the VCO frequency with the 1 MHZ clock 206 and register 204, as shown in FIG. 2, and accumulator widths, as shown in FIG. 2, is as follows:

$$F_{VCO} = \left( \frac{(1)}{\frac{16384}{CNT\ IN\ FREQ\ SELECTION\ REG}(1 * 10^{-6}\ SEC)\, 2^{(CNT\ IN\ EXECUTION\ CLOCK\ DIV\ REG)}} \right) * \frac{1}{1024} \quad \text{(Equation 10)}$$

Solving this equation for the counts to be placed in the frequency selection register results in the relationship:

$$\text{CNT IN FREQ SELECTION REG} = 16.77726 * 2^{(CNT\ IN\ EXECUTION\ CLOCK\ DIV\ REG)} * F_{VCO} \quad \text{(Equation 11)}$$

It should further be appreciated that the capability to divide down the 1 MHZ clock 206 may also be provided using a suitable input 202, as shown in FIG. 2. Alternatively, the execution clock divide register 204 may simply be fed a constant one.

Also, having caused the VCO to run at the correct frequency for locking the modulation, the amplitude of the modulation needs to be addressed. It is desirable to increase the amplitude of the modulation when the acoustic pressure wave increases in magnitude. It is also desirable to have little or no amplitude if the modulation is not close to a 180 phase shift with respect to the acoustic pressure wave. This should be appreciated by one of ordinary skill in the art, since otherwise the modulation will only worsen the acoustic. In accordance with one embodiment of the methods and systems of the invention, the solution to both these desired actions is to add an Automatic Gain Control (AGC) 46, as shown in FIG. 1.

By providing the AGC 46 with both the maximum power of the acoustic pressure wave 70, the frequency error 72, and the phase error 74, the AGC 46 can adjust the amplitude of the modulation as desired. Specifically, the AGC 46 outputs a gain signal via the path 53 to the FPGA 50. The gain signal 53 is proportional to the maximum power of the acoustic pressure wave and inversely proportional to the absolute value of the phase error and the absolute value of the frequency error. Priority is given to the phase error so that no modulation is provided until the phase relation nears 180 degrees regardless of the magnitude of the acoustic pressure wave.

Hereinafter, further features of the systems and methods of the invention will be described with further reference to FIG. 2 and implementation of the VCO in the FPGA 50. It should be appreciated that a core component of the VCO is a 24 bit wide accumulator register 216, as shown in FIG. 2. An accumulation execution occurs at a rate equal to the 1 MHZ clock 206 divided by $2^{(CNT\ IN\ EXECUTION\ CLOCK\ DIV\ REG)}$ in accordance with one embodiment of the methods and systems of the invention. At this time the contents of the accumulator 216 are added to the contents of a frequency selection register 210 and the sum is then output to accumulator 216. Bits 14–23 of the accumulator 216 are then mapped to bits 0–9 of the instantaneous phase register 56. Accumulator bits 14 22 are used as an index into a sine magnitude table 212, as shown in FIG. 2. The table 212 contains the magnitudes of a sine wave for the range of 0 to 179.64844375 degrees, in accordance with one embodiment of the methods and systems of the invention.

In accordance with one embodiment of the invention, the contents of the table 212 are counts from 0 to 255 corresponding to 0 to 1.0. The value of the indexed table entry, i.e., bits 0–8 is mapped as bits 2–10 of a shift register 218. Bits 0 and 1 of the shift register 218 are set to 0. The half sine wave contained in the table 212 is expanded to a full sine wave by the use of bit 23 of the accumulator 216, which maps to bit 11 of the shift register 218. Using this technique reduces real estate, i.e., memory, utilization for the sine table 212 in the FPGA 50. Finally, the contents of the shift register 218 are shifted right by the count value in the magnitude selection register 54 and passed to the D/A 60 via path 62.

Hereinafter, further aspects of the systems and methods of the invention will be described with reference to FIG. 3. FIG. 3 is a diagram showing further details of the processing being performed in the signal processing portion 20 of FIG. 1. As shown in FIG. 3, input 302 includes the two samples that are simultaneously taken, by the DMA 14, from the A/D 12 and from the F.P.G.A.'s instantaneous phase register 56. These two samples from the A/D 12 and from the phase register 56 are input into the memory portion 306 and the memory portion 316, respectively. Each memory portion 306 and 316 is provided with 2048 respective samples.

The samples in memory portion 306 are then passed through respective windows. Specifically, the window 308 is used in conjunction with the calculation of the (K-1) single frequency DFT in the processing portion 312. The window 310 is used in conjunction with the calculation of the (K) single frequency DFT in the processing portion 314. Also, the window 328 is used in conjunction with the calculation of the FFT in the processing portion 330.

The windows 308, 310 and 328 utilize a mathematical windowing technique, such as a Blackman or Flat Top technique, as is described above. It should be appreciated that the windows 308, 310 and 328 may use the same windowing technique or different windowing techniques.

In accordance with this embodiment of the invention, further aspects of the FFT processing will be described. As noted above, a complete set of 2,048 samples, i.e., 2048 samples of the acoustic pressure wave at 2048 addresses, is available in the memory 306. The desired output of the window 328 and the FFT processed in the processing portion 330 is a power versus frequency matrix, and a phase versus frequency matrix or relationships. Specifically, the pressure signal is broken into spectral or frequency components using the window 328, the processing portion 330 and the processing portion 332, aspects of which are also described above.

Each of these spectral components is then looked at by the processing portion 334 to determine the magnitude at each of the frequency components. Then, the processing portion 334 determines the frequency component with the largest power and therefore, the largest magnitude. The relationship of magnitude to power is given by the following equation:

MAGNITUDE=SQUARE ROOT(POWER)

As a result, the processing portion 334 generates output 338 providing the maximum power and the output 340 providing the particular frequency that has that maximum power.

As a result, the power, and magnitude of the acoustic is known and the approximate frequency of the acoustic is known. However, it should be appreciated that the FFT processing produces frequencies with only a certain resolution. Accordingly, the frequency of the acoustic is only approximately known and the power and magnitude are known. Thus, it should be noted that the frequency is not known exactly, nor has phase information been determined. These further determinations are provided by the other processing of FIG. 3.

Hereinafter, operations of the processing portion 312 and the processing portion 314 will be further described. In accordance with this embodiment of the invention, the 2048 samples are split into two sets of 1024. A windowing process is performed on each set using the windows 308 and 310. Further, a single frequency DFT is performed on each set in the processing portion 312 and the processing portion 314, respectively. The single frequency DFT's are calculated for the frequency at which the maximum power occurred as determined by the FFT, i.e. the frequency with maximum power 340, as shown in FIG. 3. This processing yields a phase. To explain further, the window 308 and the processing portion 312 yield an instantaneous phase of the single frequency at the time of the first sample, i.e., sample one, out of the 2048 list. Further, the window 310 and the processing portion 314 yield an instantaneous phase of the single frequency at the time of sample 1025. Accordingly, the acoustic's phase is measured and thus known at two points in time as represented by sample 1 and sample 1025.

The output from the processing portion 312 is input into the processing portion 324. Also, the frequency with the maximum power information 340, described above, is input into the processing portion 324. Based on this input, the processing portion 324 determines the phase of the frequency with the maximum power based on the first set of samples, and outputs this information as output 335. The output 335, which is based on the first sample, thus may be characterized as the acoustic pressure phase (K-1).

Also, the output from the processing portion 314 is input into the processing portion 326. Also, the frequency with the maximum power information 340, described above, is input into the processing portion 326. Based on this input, the processing portion 326 determines the phase of the frequency with the maximum power based on the second set of samples, and outputs this information as output 336. The output 336, which is based on the second sample, thus may be characterized as the acoustic pressure phase (K).

Turning now to the samples in the memory 316, which are input from the phase register 56, these samples provide the instantaneous phase angles of the modulations, i.e., including the instantaneous phase angles, for sample 1 and sample 1025. These samples are taken simultaneously with the pressure waves. Thus, the method of the invention has allowed a phase angle comparison to be made. That is, at two points in time it is known what the acoustic phase was and what the modulation phase was.

Accordingly, the process of the invention generates an output 318 based on sample 1025, which provides modulation phase K information. Also, the output 320 based on sample 1 is generated that provides modulation phase (K-1) information. These outputs are adjusted using a scaling factor 317, i.e., "scaling in Deg/CNT." This is done since all the samples in the memory 316, of FIG. 3, are in units of counts. These counts have a specific conversion to units of degrees. In one exemplary implementation of the invention, 1 FPGA count corresponds to 0.3515625 degrees. Also, the modulation phase outputs based on sample 1 and sample 1025 may be adjusted by a propagation delay compensation factor. This propagation delay compensation factor may be calculated by the processing portion 322, as is described above.

Figure 6:
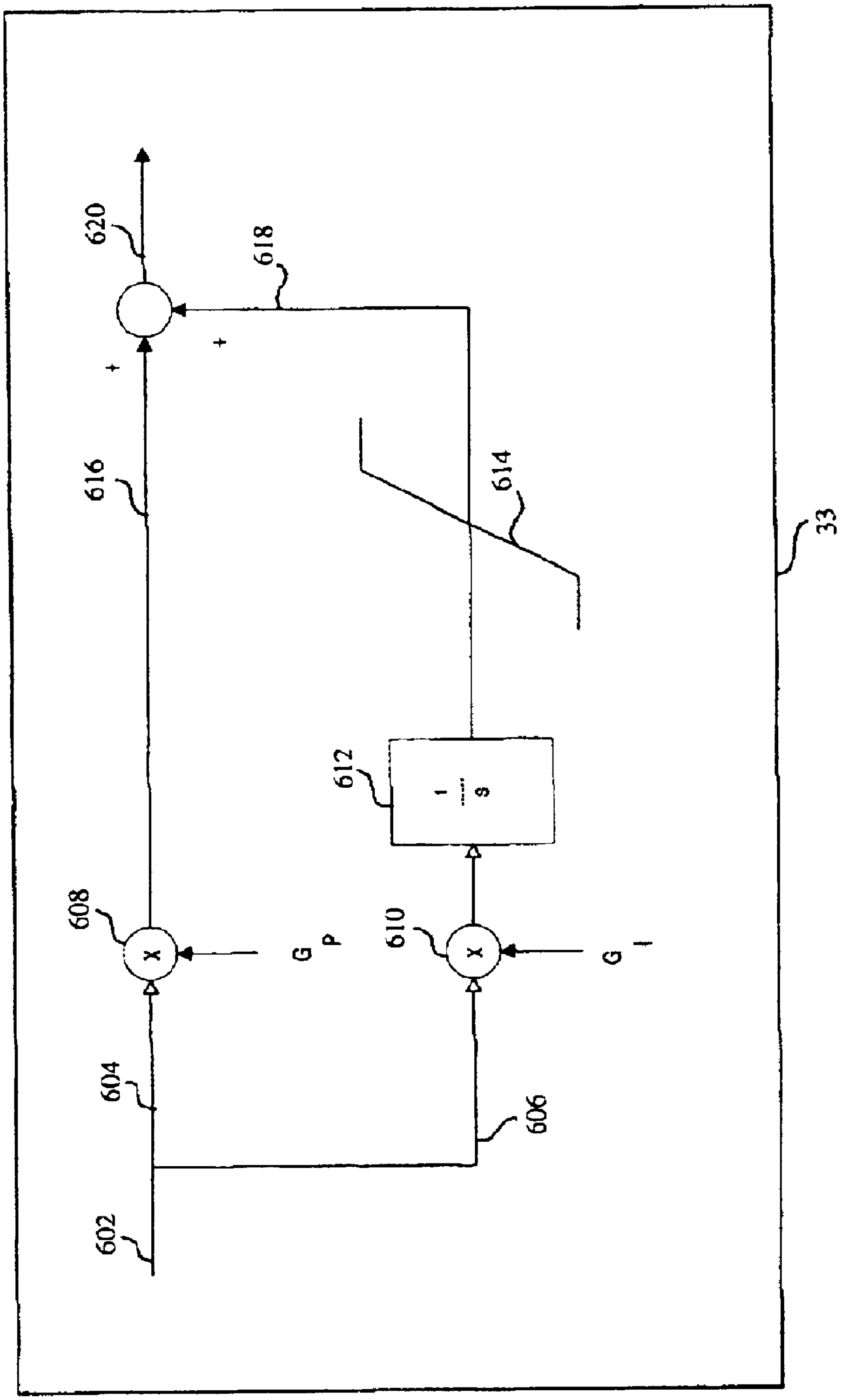
FIG. 6 is a schematic diagram showing a proportional integral control processing portion of FIG. 1 in further detail in accordance with one embodiment of the methods and systems of the invention.

FIG. 6 is a diagram showing in further detail the proportional and integral control portion 33 of FIG. 1, in accordance with one embodiment of the invention. As shown in FIG. 6, an input signal 602 is input into the proportional and integral control portion 33 as described above. This input signal is then split into two signals, i.e., signal 604 and signal 606. A gain $G_P$ 608 is applied to the signal 604, thus resulting in the adjusted signal 616. Further, a gain $G_I$ 610 is applied to the signal 606. These respective gains $G_P$ and $G_I$ may be determined in any suitable manner. As used "$G_P$" is the symbolic name for "Gain of the Proportional" and "$G_I$" is the symbolic name for "Gain of the Integral."

As shown in FIG. 6, once the gain 610 is applied to the signal 606, then a suitable transfer function is applied in the processing portion 612. A transfer function defines the relationship between the inputs to a system and its outputs. The transfer function is typically written in the frequency, or 's' domain, rather than the time domain. Illustratively, a Laplace transform, for example, may be used to map the time domain representation into the frequency domain representation. The specific transfer function 1/S represents an integration. Once the transfer function is applied, a clamp 614 is then applied to the signal, thus resulting in the adjusted signal 618. The adjusted signal 618 is then added to the adjusted signal 616 in order to generate an output signal 620. The output signal 620 is then used in further processing in accordance with some embodiments of the invention, as is described above.

FIG. 6, as described above, shows further details of the proportional and integral control portion 33. It should be appreciated that the proportional and integral control portion 39, as shown in FIG. 1, may utilize a similar arrangement as that of the proportional and integral control portion 33. Accordingly, details of the proportional and integral control portion 39 have not been described in further detail.

Figure 7:
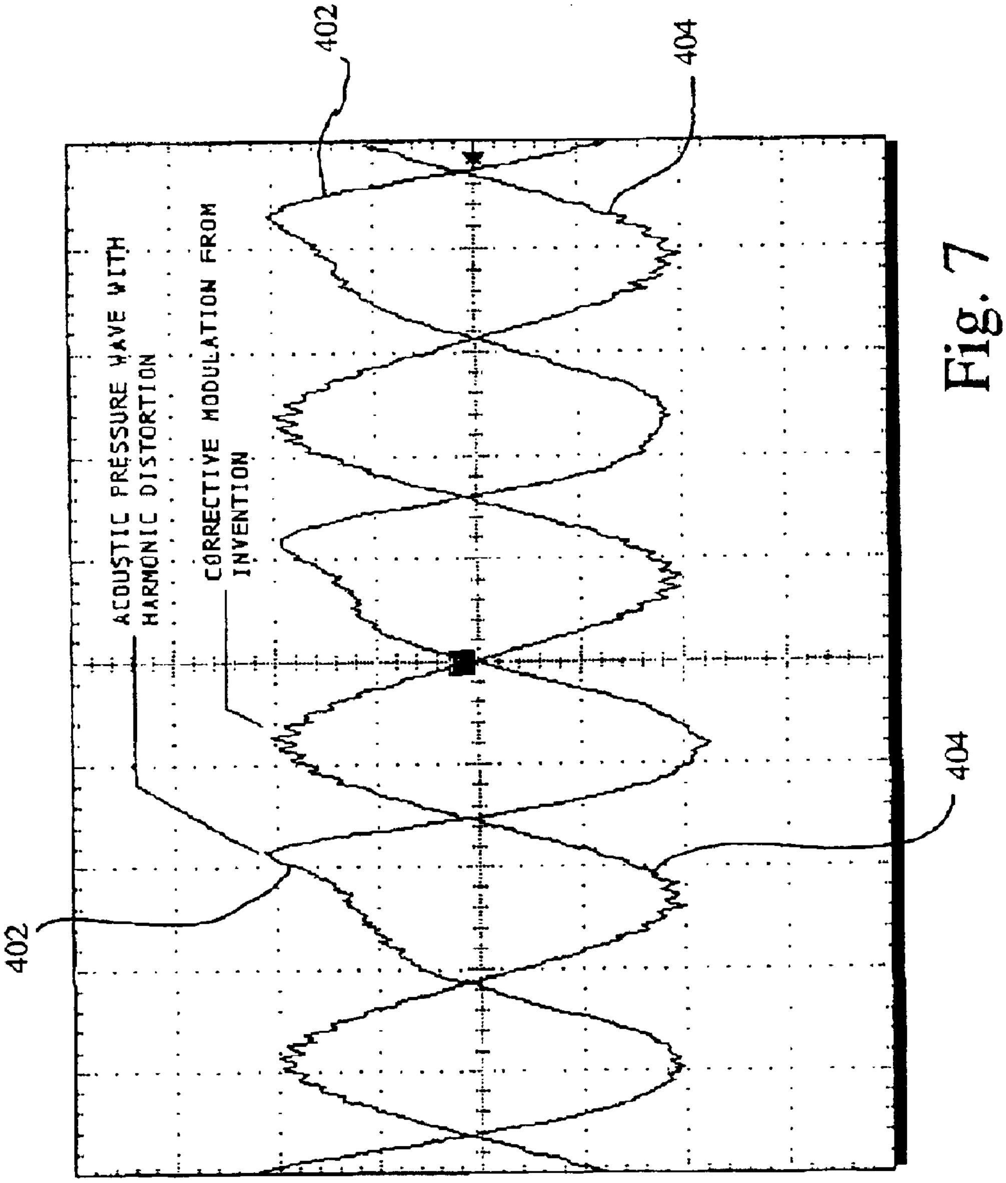
FIG. 7 is a diagram showing an acoustic pressure wave with harmonic distortion and a corrective modulation to be applied to suppress the acoustic pressure wave in accordance with one embodiment of the methods and systems of the invention.

In further explanation of the systems and methods of the invention, FIG. 7 is a scope tracing showing an acoustic pressure wave 402 with harmonic distortion, as well as a corrective modulation wave 404, which is generated using the process of the invention. Specifically, the acoustic pressure wave 402 is generated from the actual signal coming from the differential pressure transducer 10, as shown in FIG. 1. It should be appreciate that in accordance with the methods and systems of the invention, the corrective modulation wave 404 may be scaled in such a manner so as to essentially eliminate the acoustic pressure wave 402. That is, the two waves cancel each other out. It should be noted that, as seen in FIG. 7, the distortion at the troughs and crests of the respective waves is an artifact of a digital scope that was utilized, as opposed to an actual frequency component in the respective waves.

It should further be appreciated that it may be desirable to not achieve 100% cancellation of the acoustic pressure wave, but rather to reduce the magnitude of the wave to a magnitude where it possesses insufficient power to cause damage or adversely affect machine performance. That is, in accordance with one embodiment of the methods and systems of the invention, a residue of the acoustic pressure wave is allowed to remain. This allows the corrective modulation 404 to remain "locked on" to the acoustic pressure wave 402. In contrast, if the acoustic pressure wave 402 was completely canceled out, the lock-on would be lost. Accordingly, it may be desired to control the magnitude of the corrective modulation. This control is performed using the automatic gain control 46, as described above.

Also, the systems and methods in accordance with various embodiments of the invention have been described above using 2048 samples. However, as noted above, it should be appreciated that the practice of the invention is not limited to such a sample size. Rather, other suitable sample sizes may also be used.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the claims and their legal equivalents.

What is claimed is:

1. A method for providing a corrective modulation signal to suppress an acoustic pressure wave in an operational system, the method comprising the steps of:

sampling the acoustic pressure wave generated in the operational system;

sampling a previously generated corrective modulation signal, the previously generated corrective modulation signal having parameters;

performing fast Fourier transform processing on the sampled acoustic pressure wave;

performing a pair of single frequency discrete Fourier transform processing on the sampled acoustic pressure wave;

determining the frequency, phase and magnitude of a dominate pressure wave in the acoustic pressure wave based on the fast Fourier transform processing and the discrete Fourier transform processing; and generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave.

2. The method of claim 1, wherein the operational system is a gas turbine.

3. The method of claim 1, wherein the corrective modulation signal is generated at a 180 degree relationship to the acoustic pressure wave.

4. The method of claim 1, wherein the sampling is performed using a pressure transducer.

5. The method of claim 1, further including the step of providing a gain control, the gain control generating a gain signal to adjust the corrective modulation signal.

6. The method of claim 1, wherein the step of performing fast Fourier transform processing on the sampled acoustic pressure wave is performed in conjunction with using a mathematical windowing process; and the step of performing a pair of single frequency discrete Fourier transform processing on the sampled acoustic pressure wave is performed in conjunction with using a mathematical windowing process.

7. The method of claim 1, further including the steps of:

generating a corrected phase error, the corrected phase error being processed in conjunction with the step of generating a corrective modulation signal; and generating a frequency error, the frequency error being processed with the corrected phase error.

8. A corrective modulation system for providing a corrective modulation signal to suppress an acoustic pressure wave in an operational system, the system comprising:

a pressure sampling device that samples the acoustic pressure wave generated in the operational system to provide a sample of the acoustic pressure wave;

a phase output portion, the phase output portion providing a sample of a phase of a previously generated corrective modulation;

a signal processing portion that processes the sample of the acoustic pressure wave and the sample of the phase of the previously generated corrective modulation, the signal processing portion including:

a fast Fourier transform processing portion that performs a fast Fourier transform process on the sample of the acoustic pressure wave, the signal processing portion generating frequency with maximum power information and maximum power information based on the fast Fourier transform process;

at least two discrete Fourier transform processing portions that perform single frequency discrete Fourier transform processing, the signal processing portion generating pressure phase information based on the single frequency discrete Fourier transform processing, and a modulation phase processing portion, the modulation phase processing portion generating modulation phase information based on the sample of the phase of the previously generated corrective modulation; and a corrective modulation generator that generates a sinusoidal corrective modulation signal to suppress the acoustic pressure wave based on the frequency with maximum power information and maximum power information, the pressure phase information, and the modulation phase information, wherein the corrective modulation signal being at substantially the same frequency as, and generally 180 degrees out of phase with, the acoustic pressure wave.

9. The corrective modulation system of claim 8, wherein the operational system is a gas turbine.

10. The corrective modulation system of claim 8, wherein the phase output portion is a phase register.

11. The corrective modulation system of claim 10, further including a direct memory addressing unit, the direct memory addressing unit processing the acoustic pressure wave generated in the operational system, that is input from the pressure sampling device, and processing the sample of the phase of the previously generated corrective modulation, that is input from the phase register.

12. The corrective modulation system of claim 11, wherein the direct memory addressing unit inputs pairs of simultaneous samples from the pressure sampling device and from the phase register.

13. The corrective modulation system of claim 12, wherein the direct memory addressing unit inputs 2048 pairs of simultaneous samples from the pressure sampling device and from the phase register.

14. The corrective modulation system of claim 8, wherein the signal processing portion uses respective mathematical windowing processes in conjunction with the fast Fourier transform process performed by the fast Fourier transform processing portion and the single frequency discrete Fourier transform processing performed by the at least two discrete Fourier transform processing portions.

15. The corrective modulation system of claim 8, wherein the corrective modulation generator is a field programmable gate array.

16. The corrective modulation system of claim 8, wherein the pressure sampling device is a differential pressure transducer.

17. The corrective modulation system of claim 16, wherein the operational system is a gas turbine having a combustion chamber, the pressure sampling device being placed within the combustion chamber.

18. The corrective modulation system of claim 8, the system further including an automatic gain control, the automatic gain control outputting a gain signal to the corrective modulation generator such that the corrective modulation generator may adjust the corrective modulation signal.

19. The corrective modulation system of claim 18, wherein the gain signal is proportional to a maximum power of the acoustic pressure wave, the gain signal resulting in a remnant of the acoustic pressure wave being left.

20. The corrective modulation system of claim 8, wherein:

the single frequency discrete Fourier transform processing, performed by the at least two discrete Fourier transform processing portions, includes performing a first single frequency discrete Fourier transform on a first part of the sample of the acoustic pressure wave, which is processed by the signal processing portion to generate pressure phase$_K$ information, and performing a second single frequency discrete Fourier transform on a second part of the sample of the acoustic pressure wave, which is processed by the signal processing portion to generate pressure phase$_{K-1}$ information, and the modulation phase information, generated by the modulation phase processing portion, includes modulation phase$_K$ information and modulation phase$_{K-1}$ information; and the corrective modulation generator generates the sinusoidal corrective modulation signal to suppress the acoustic pressure wave based on:

the frequency with maximum power information and maximum power information;

the pressure phase$_K$ information and the pressure phase$_{K-1}$ information; and modulation phase$_K$ information and modulation phase$_{K-1}$ information.

21. The corrective modulation system of claim 20, wherein the at least two discrete Fourier transform processing portions includes:

a first fast Fourier transform processing portion that performs a fast Fourier transform process on the first part of the sample of the acoustic pressure wave;

a second fast Fourier transform processing portion that performs a fast Fourier transform process on the second part of the sample of the acoustic pressure wave.

22. The corrective modulation system of claim 20, wherein:

the pressure phase$_K$ information is compared with the modulation phase$_K$ information, by the signal processing portion, to generate a corrected phase error and a frequency error; and the pressure phase$_{K-1}$ information is compared with the modulation phase$_{K-1}$ information, by the signal processing portion, to generate the frequency error.

23. A system for providing a corrective modulation signal to suppress an acoustic pressure wave in an operational system, the system comprising:

means for sampling the acoustic pressure wave generated in the operational system;

means for sampling a previously generated corrective modulation signal, the previously generated corrective modulation signal having parameters;

means for performing fast Fourier transform processing on the sampled acoustic pressure wave;

means for performing a pair of single frequency discrete Fourier transform processing on the sampled acoustic pressure wave;

means for determining the frequency, phase and magnitude of a dominate pressure wave in the acoustic pressure wave based on the fast Fourier transform processing and the discrete Fourier transform processing; and means for generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave.

24. A method for providing a corrective modulation signal to suppress an acoustic pressure wave in a gas turbine system, the method comprising the steps of:

sampling the acoustic pressure wave generated in the gas turbine system;

sampling a previously generated corrective modulation signal, the previously generated corrective modulation signal having parameters;

performing fast Fourier transform processing on the sampled acoustic pressure wave;

performing a pair of single frequency discrete Fourier transform processing on the sampled acoustic pressure wave;

determining the frequency, phase and magnitude of a dominate pressure wave in the acoustic pressure wave based on the fast Fourier transform processing and the discrete Fourier transform processing;

generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave;

generating a frequency error;

generating a phase error; and providing a gain control based on the frequency error, the phase error and the magnitude of the dominate pressure wave, the gain control generating a gain signal to adjust the corrective modulation signal.

25. The method of claim 24, wherein the sampling is performed using a pressure transducer.

26. The method of claim 24, wherein the step of performing fast Fourier transform processing on the sampled acoustic pressure wave is performed in conjunction with using a mathematical windowing process; and the step of performing a pair of single frequency discrete Fourier transform processing on the sampled acoustic pressure wave is performed in conjunction with using a mathematical windowing process.

27. The method of claim 24, further including the steps of:

generating a corrected phase error, the corrected phase error being processed in conjunction with the step of generating a corrective modulation signal; and generating a frequency error, the frequency error being processed with the corrected phase error.

28. A corrective modulation system for providing a corrective modulation signal to suppress an acoustic pressure wave in an operational system, the system comprising:

a pressure sampling device that samples the acoustic pressure wave generated in the operational system to provide a sample of the acoustic pressure wave;

a phase output portion, the phase output portion providing a sample of a previously generated corrective modulation;

a signal processing portion that processes the sample of the acoustic pressure wave and the sample of the previously generated corrective modulation, the signal processing portion including:

a fast Fourier transform processing portion that performs a fast Fourier transform process on the sample of the acoustic pressure wave, the signal processing portion generating frequency with maximum power information and maximum power information based on the fast Fourier transform process;

at least one discrete Fourier transform processing portion that performs single frequency discrete Fourier transform processing, the single frequency discrete Fourier transform processing including performing a first single frequency discrete Fourier transform on a first part of the sample, which is processed by the signal processing portion to generate pressure $phase_K$ information, and performing a second single frequency discrete Fourier transform on a second part of the sample, which is processed by the signal processing portion to generate pressure $phase_{K-1}$ information, and a modulation phase processing portion, the modulation phase processing portion generating modulation $phase_K$ information and modulation $phase_{K-1}$ information based on the sample of the previously generated corrective modulation;

a corrective modulation generator that generates a sinusoidal corrective modulation signal to suppress the acoustic pressure wave based on:

the frequency with maximum power information and maximum power information;

the pressure $phase_K$ information and the pressure $phase_{K-1}$ information; and modulation $phase_K$ information and modulation $phase_{K-1}$ information; and the corrective modulation signal being at substantially the same frequency as, and generally 180 degrees out of phase with, the acoustic pressure wave.

29. A system for providing a corrective modulation signal to suppress an acoustic pressure wave in a gas turbine, the system comprising:

means for sampling the acoustic pressure wave generated in the gas turbine;

means for sampling a previously generated corrective modulation signal, the previously generated corrective modulation signal having parameters;

means for performing fast Fourier transform processing on the sampled acoustic pressure wave;

means for performing a pair of single frequency discrete Fourier transform processing on the sampled acoustic pressure wave;

means for determining the frequency, phase and magnitude of a dominate pressure wave in the acoustic pressure wave based on the fast Fourier transform processing and the discrete Fourier transform processing;

means for generating a sinusoidal corrective modulation signal to suppress the acoustic pressure wave based on the frequency, phase and magnitude of the dominate pressure wave and the parameters of the previously generated corrective modulation signal, the corrective modulation signal being at substantially the same frequency as, and generally 180 degrees out of phase with, the acoustic pressure wave;

means for generating a frequency error;

means for generating a phase error; and means for providing a gain control based on the frequency error, the phase error and the magnitude of the dominate pressure wave, the gain control generating a gain signal to adjust the corrective modulation signal.

* * * * *

UNITED STATES PATENT AND TRADEMARK OFFICE
CERTIFICATE OF CORRECTION

PATENT NO. : 6,879,922 B2
APPLICATION NO. : 09/682559
DATED : April 12, 2005
INVENTOR(S) : Joseph Alan Hogle et al.

It is certified that error appears in the above-identified patent and that said Letters Patent is hereby corrected as shown below:

Equation 4, col. 9, line 17: replace "FFF" with --FFT--.

Signed and Sealed this

Seventeenth Day of October, 2006

JON W. DUDAS
*Director of the United States Patent and Trademark Office*